Patented May 29, 1951

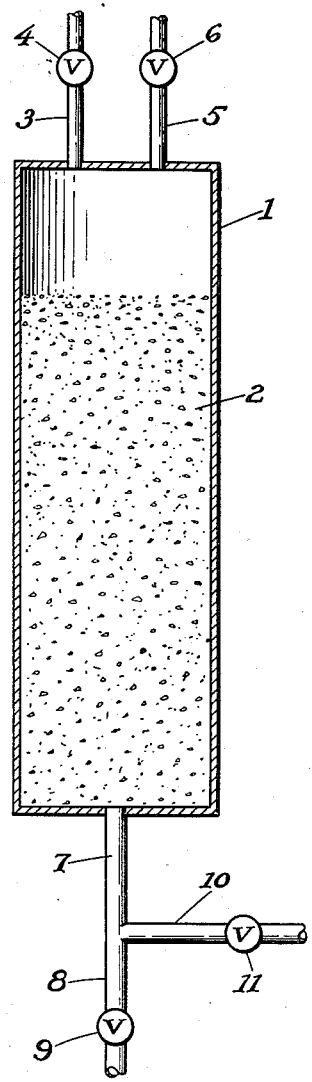

2,554,649

UNITED STATES PATENT OFFICE 2,554,649

SEPARATION OF RADIUM FROM BARIUM

Edward R. Tompkins, Berkeley, Calif., assignor to the United States of America as represented by the United States Atomic Energy Commission Applicaion December 13, 1948, Serial No. 64,961

13 Claims. (Cl. 260—429)

The present invention relates in general to a new and improved method for the purification of radium, and more particularly to an ion-exchange process for the separation of radium from barium.

As is known, an extremely difficult phase in the production of radium from its ores comprises the separation of radium from considerably larger amounts of barium. The quite similar chemical characteristics of these elements makes practical separation by ordinary chemical reaction means virtually impossible. In current radium production processes, radium and barium are separated by fractional crystallization. This process has remained essentially unchanged for decades, although it is a very tedious process, requiring many recrystallizations and extensive recycling of the various fractions to obtain a clean separation without excessive losses.

One object of the present invention is to provide a new and improved process for the separation of radium from barium.

Another object is to provide such a process which effects a separation of radium in high yield and purity more rapidly and directly than methods presently conventional.

A further object is to provide such a process which also affords separation of radium from other difficultly separable alkaline earths, such as strontium.

Other objects will become apparent hereinafter.

In accordance with the present invention radium may be separated from a solution containing the same together with barium and other material by a process which comprises passing the said solution through a cation-exchange adsorbent under conditions favoring adsorption of radium and barium, together with other material, and chromatographically eluting radium and barium from the adsorbent, collecting the fraction of eluate containing radium.

The accompanying drawing diagrammatically illustrates a system which may be utilized in the practice of the present invention. Referring to the drawing, I designates a column containing a suitable adsorbent 2. To the upper portion of column I are connected line 3 controlled by valve 4, and line 5 controlled by valve 6. From the lower portion of column I leads line 7 which feeds into line 8 controlled by valve 9, and line 10 controlled by valve 11.

In operation of the system described above, a solution containing radium together with barium is passed through line 3 into column I wherein radium, barium, and other dissolved material, such as strontium, which may be present, are adsorbed by adsorbent 2, the solvent passing out the bottom of the column through line 10. Valve 4 is then closed, valve 6 opened, and an eluting agent is admitted through line 5. The eluting agent chromatographically elutes the adsorbate, the various components moving down through the adsorbent bed 2 at different specific rates. As it leaves the column, the fractions containing barium and other material are passed through lines 7 and 10 to disposal or further treatment, valve 9 being closed. Upon leaving the column, the fraction of eluate containing radium is passed through lines 7 and 10 to storage or further processing, valve 11 being closed.

It is in further accordance with the present invention to effect the process by passing the said solution containing radium together with other material, particularly barium, in a unidirectional flow through a bed of the cation-exchange adsorbent under conditions favoring adsorption of radium and barium, and thereafter passing through the adsorbent bed, in substantially the same direction as the flow of solution during adsorption, an aqueous solution of a polycarboxylic-acid salt chosen from the group consisting of the sodium, potassium, and ammonium salts thereof, under conditions of controlled pH and concentration, thereby chromatographically eluting at least the barium and radium constituents of the absorbate. In addition to separation from barium, separation of radium from other materials, such as strontium, other difficultly separable alkaline earths, and the like, is also afforded by such eluting agents.

The solutions of radium which may be treated in accordance with this invention are subject to wide variation. Especially well suited for present purposes are dilute aqueous solutions of the materials to be separated. The solutions should be free from deleterious concentrations of substances that hinder adsorption, for instance complexing agents. Likewise excess acidity or alkalinity of the solution should be avoided or mitigated prior to adsorption. It has been found particularly preferable to adsorb the materials from aqueous solutions of chlorides or nitrates.

The adsorption of the radium-containing solutions is carried out by the employment of cation-exchange adsorbents, that is, those in which the cation of the adsorbent is exchanged for a similarly charged ion of the substance being adsorbed. It has been found that the process is particularly effective where the adsorbent used is a relatively inert organic material containing free sulfonic acid groups. Thus, the adsorbent may comprise poly-vinyl aryl resins, phenol-formaldehyde resins, lignite, phenol-tannic acid resins, or the like, which contain numerous —R—SO$_3$—R' groups in which R is an organic group and in which R' may be hydrogen or may be a metal ion, preferably Na$^+$. A cation-exchange adsorbent found to be eminently suited for present purposes is a sulfonated polymerizate of a poly-vinyl aryl compound, such as that described in U. S. Patent 2,366,007 (G. F. D'Alelio, August 11, 1942). In the adsorption process, the hydrogen of the sulfonic acid group is replaced by a cation of the substance to be adsorbed, which thereupon forms a more or less loosely associated molecule with the resin. The adsorbent used should be finely divided; it is particularly advantageous to employ adsorbents comminuted to a particular size as fine as or finer than approximately 50 U. S. mesh.

The sodium, potassium, or ammonium salts of many various types of polycarboxylic acids may be quite satisfactorily employed as eluting agents in accordance with this invention. They may well be either aliphatic or aromatic, saturated or unsaturated, and may contain radicals in addition to those required for the acid to meet the requisites of the generic specification presented hereinbefore, unless such additional radicals have propensities toward entering into deleterious reaction with the cations being eluted, the adsorbent, or generally with the system being treated. More specifically the said salts of saturated dicarboxylic acids, for instance, have been found to be very satisfactory as elutriants; a few examples being oxalates, malonates, succinates, and tartrates. Two examples of satisfactory unsaturated dicarboxylic-acid salts are fumarates and maleates. Aromatic dicarboxylic-acid salts which give satisfactory results include ortho, meta, and para phthallic acids. Satisfactory tricarboxylic acid salts include citrates. It has been found that sodium, potassium, and ammonium citrates are especially well suited as chromatographic elutriants in the present invention.

The operation of the chromatographic elution is materially affected by the pH and concentration of the eluting solution. The conditions of pH and concentration which should properly be used depend on various factors, including the particular elutriant used, the relative quantities of the materials being separated, and the desired degree of separation and purity of the final radium eluate. Generally speaking, the concentration of the polycarboxylate radical in the elutriant should be of fractional molarity and the pH above approximately 4.5. In general, the more alkaline and more concentrated the solution, the more rapid the separation, but the lower the purity of the separated radium fraction. It has been found particularly advantageous, especially when aqueous ammonium citrate solution is used as the elutriant, to employ a pH of between 7.5 and 8.0. It is preferable to obtain the desired pH of the elutriant by including in the solution, along with the salt of a polycarboxylic acid, the proper amount of the corresponding polycarboxylic acid. Such a solution is prepared in a convenient manner by adding a sodium, potassium, or ammonium hydroxide to an aqueous solution of a polycarboxylic acid.

It is very desirable in conducting the processes of the present invention that the flow of each solution through the adsorbent bed be substantially unidirectional, and that the flow of the elutriant be in the same direction as the flow of feed solution during adsorption. In this matter, it has been found preferable to utilize an adsorbent bed disposed in a vertical column, as shown in the accompanying drawing, passing the solution downward by gravity through the bed. When such an arrangement is used, solute components of the feed solution are ordinarily adsorbed in a band at the top of the bed in the adsorption step. Upon subsequent chromatographic elution, each of the constituents has a specific average rate of exchange between the adsorbent and the elutriant, causing each constituent to move through the bed at a different rate of travel. The barium ordinarily precedes the radium through the bed, and if strontium or lanthanum are present, they ordinarily precede the barium. Separate eluate fractions, each enriched in a particular constituent may thus be successively collected. Moreover, since the separation depends on differential rate of movement through the bed, it follows generally that the greater the thickness of adsorbent through which the chromatographic eluate flows, the greater will be the degree of separation.

In conducting these processes, the scale of operations may be of a size ranging from that employing very small laboratory scale adsorption columns several centimeters in diameter to large industrial scale utilizing columns several feet in diameter. For example advantageous results may be obtained with a glass-lined steel column 2.5 ft. in diameter and containing a 5 ft. high adsorbent bed having a volume of 24.5 cubic ft.

The process of this invention is especially effective in the substantially complete isolation of radium, in a simple operation, from solutions having radium concentrations below $10^{-10}$ molar but containing macroscopic quantities of barium. With macroscopic quantities of radium it is in some cases more desirable, for greatest rapidity and efficiency, to employ a stage-wise repetition of the present process, effecting a fractionation in the first stage, followed by subsequent radium purification stages.

In the practice of this invention it is desirable to carefully control certain operation variables, such as rate of flow of solutions through the column. Generally speaking, the flow rate of initial feed solution while effecting the adsorption is advantageously maintained at 20 to 120 gallons per square foot per hour and preferably at 90 to 100 gals./sq. ft./hr. The flow rate of the elutriant is advantageously maintained at a low value, such as between 1 to 10 gals./sq. ft./hr.; particularly advantageous results may be obtained at flow rates of 3 to 5 gal./sq. ft./hr.

The present invention may be further illustrated by the following specific example:

EXAMPLE

A dilute aqueous nitrate solution containing 20 micrograms of radium, 20 milligrams of barium and 20 milligrams of strontium, along with Ba$^{140}$ and Sr$^{89, 90}$ tracers, was slowly passed through a column of cation-exchange resin, causing the solute mixture to be adsorbed at the top of the resin bed. The resin used was a very finely comminuted sulfonated polymerizate of a poly-vinyl aryl compound; the bed was 1 square centimeter in cross-section and 15 centimeters long. An elutriant comprising an aqueous solution of citric acid and ammonium citrate, adjusted to a pH of between 7.5 and 8.0 and a citrate concentration 0.5 molar, was then passed downflow through the column at a flow rate of 0.3 ml./cm.²/min. The eluate was collected in successive fractions and analyzed radiometrically. The table presented hereinafter summarizes the analytical results.

TABLE

*Composition of eluate fractions from separations column*

| Fraction | Per Cent of Total | | | | | Percentage Composition of Fractions | | | | |
|---|---|---|---|---|---|---|---|---|---|---|
| | Vol. of Fraction, ml. | La [1] | Sr | Ba | Ra | La | Sr | Ba | Ra | Ra Decay Products |
| I | 1 | 16.7 | 2.9 | | | 88 | 12 | | | |
| II | 6 | 75.0 | 4.4 | | | 97 | 3 | | | |
| III | 3 | 1.1 | 6.3 | | | 6 | 94 | | | |
| IV | 7 | 0.0 | 78.5 | | | | 100 | | | |
| V | 15 | [2] 1.0 | 7.8 | | | 4 | 96 | | | |
| VI | 11 | 0.4 | 0.1 | | | 82 | 18 | | | |
| VII | 15 | 5.8 | | 82.5 | | 27 | | 73 | | |
| VIII | 12 | | | 15.9 | | | | 86 | | 14 |
| IX | 12 | | | 1.6 | | | | 50 | | 50 |
| X | 4 | | | | | | | | | 100 |
| XI | 12 | | | | | | | | | 100 |
| XII | 9 | | | | | | | | | 100 |
| XIII | 13 | | | | 9.4 | | | | | 100 |
| XIV | 6 | | | | 24.8 | | | | | 100 |
| XV | 8 | | | | 40.6 | | | | | 100 |
| XVI | 16 | | | | 22.5 | | | | | 100 |
| XVII | 20 | | | | 2.6 | | | | | 100 |
| XVIII | 10 | | | | 0.1 | | | | | 100 |

[1] La present as La¹⁴⁰ daughter of Ba¹⁴⁰.
[2] Elution stopped overnight after fraction 4 collected, permitting La¹⁴⁰ component of adsorbate to increase by continuing spontaneous decay of Ba¹⁴⁰.

The data in the table indicate that at this flow rate and with a depth of resin bed as small as 15 cm., the strontium, barium, and radium constitutents of the original solution were completely isolated one from another, as far as could be determined by the analytical procedure employed.

The term "eluate" or its equivalent, as used herein, is intended to include any effluent bearing a desired product from a bed of adsorbent.

The term "eluting agent," "elutriant," or equivalent is intended to include a material which removes adsorbed material from a bed of adsorbent.

The term "adsorption" is utilized in referring to removal of components from solution by a solid material. It is to be understood, however, that this invention is not to be limited in any sense by the theory upon which the process is based, and that this term is used as it is generally employed in the art of chromatographic separation.

It is to be understood that all matters contained in the above description and example are illustrative only and do not limit the scope of the present invention as it is intended to claim the invention as broadly as possible in view of the prior art.

What is claimed is:

1. An adsorption-chromatographic elution process for separating radium values from an aqueous solution containing the same, together with barium values comprising passing said solution, in a unidirectional flow, through a bed of cation-exchange adsorbent to thereby effect adsorption of radium and barium values thereupon, thereafter passing through the adsorbent bed, in substantially the same direction as the flow of solution during adsorption, an aqueous solution of fractional molarity and a pH greater than 4.5 of a polycarboxylic-acid salt chosen from the group consisting of the sodium, potassium, and ammonium salts thereof, thereby chromatographically eluting at least the barium, and then the radium constituents of the adsorbate and collecting the fraction of eluate containing radium.

2. An adsorption-chromatographic elution process for the separation of radium values from an aqueous solution containing the same, together with barium values which comprises contacting said solution with cation-exchange adsorbent to thereby effect adsorption of radium and barium values thereupon, and thereafter chromatographically eluting, in succession, barium, and then radium, constituents of the adsorbate through a bed of cation-exchange adsorbent, by passing in contact with said adsorbate and on through said bed, an aqueous solution of a polycarboxylic-acid salt chosen from the group consisting of the sodium, potassium, and ammonium salts thereof.

3. An adsorption-chromatographic elution process for the separation of radium values from an aqueous solution containing the same, together with barium values, which comprises passing the said solution through a bed of cation-exchange adsorbent to thereby effect the adsorption of radium and barium values thereupon, thereafter passing through the adsorbent bed an aqueous solution of fractional molarity and having a pH greater than 4.5 of a polycarboxylic-acid salt chosen from the group consisting of the sodium, potassium, and ammonium salts thereof, thereby chromatographically eluting at least the barium, and then the radium, constituents of the adsorbate, and collecting the fraction of eluate containing radium.

4. An adsorption-chromatographic elution process for the separate recovery of radium values and of barium values from an aqueous solution containing the same which comprises passing the said solution, in an unidirectional flow, through a bed of cation-exchange adsorbent to thereby effect adsorption of radium and barium values thereupon thereafter passing through the adsorbent bed, in substantially the same direction as the flow of solution during adsorption, an aqueous solution of fractional molarity and having a pH greater than 4.5 of a polycarboxylic-acid salt chosen from the group consisting of the sodium, potassium, and ammonium salts thereof, thereby chromatographically eluting barium values and then radium values, and collecting the barium-rich and the radium-rich fractions of eluate.

5. An adsorption-chromatographic elution process for fractionating radium, barium, and strontium values contained in an aqueous solution and recovering three individual fractions each rich in a different one of the said substances which comprises passing said solution, in a unidirectional flow, through a bed of cation-exchange adsorbent to thereby effect adsorption of radium, barium, and strontium values thereupon, thereafter passing through the adsorbent bed, in substantially the same direction as the flow of solution during adsorption, an aqueous solution of fractional molarity and having a pH greater than 4.5 of a polycarboxylic-acid salt chosen from the group consisting of the sodium, potassium, and ammonium salts thereof, thereby chromatographically eluting strontium, barium, and radium values, and collecting the strontium-rich, barium-rich, and radium-rich fractions of eluate.

6. An adsorption-chromatographic elution process for the separation of radium values from an aqueous solution containing the same, together with barium values which comprises passing said solution, in a unidirectional flow, through a bed of cation-exchange adsorbent consisting of a comminuted sulfonated polymerizate of polyvinyl aryl condensation product to thereby effect adsorption of radium and barium values thereupon, thereafter passing through the adsorbent bed, in substantially the same direction as the flow of solution during adsorption, an aqueous solution of a polycarboxylic-acid salt chosen from the group consisting of the sodium, potassium, and ammonium salts thereof, thereby chromatographically eluting at least the barium, and then the radium constituents of the adsorbate, and collecting the fraction of eluate containing radium.

7. An adsorption-chromatographic elution process for the separation of radium values from an aqueous solution containing the same, together with barium values comprising passing said solution, in a unidirectional flow, through a bed of cation-exchange adsorbent to thereby effect adsorption of radium and barium values thereupon, and thereafter passing through the adsorbent bed, in substantially the same direction as the flow of solution during adsorption, an aqueous solution of fractional molarity and a pH of between 7.5 and 8.0 of a polycarboxylic-acid salt chosen from the group consisting of the sodium, potassium, and ammonium salts thereof, thereby chromatographically eluting at least the barium, and then the radium, constituents of the adsorbate, and collecting the fraction of eluate containing radium.

8. An adsorption-chromatographic elution process for the separation of radium values from an aqueous solution containing the same, together with barium values comprising passing said solution, in a unidirectional flow, through a bed of cation-exchange adsorbent to thereby effect adsorption of radium and barium values thereupon, thereafter passing through the adsorbent bed, in substantially the same direction as the flow of solution during adsorption, at a rate of from 1 to 10 gals./sq. ft./hr. a substantially 0.5 molar aqueous solution having a pH of between 7.5 and 8.0 of a polycarboxylic-acid salt chosen from the group consisting of the sodium, potassium, and ammonium salts thereof, thereby chromatographically eluting at least the barium, and then the radium, constituents of the adsorbate, and collecting the fraction of eluate containing radium.

9. An adsorption-chromatographic elution process for separating radium values from an aqueous solution containing the same, together with barium values comprising passing said solution, in a unidirectional flow, through a bed of cation-exchange adsorbent to thereby effect adsorption of radium and barium values thereupon, thereafter passing through the adsorbent bed, in substantially the same direction as the flow of solution during adsorption, an aqueous solution of fractional molarity and a pH greater than 4.5 of a citrate salt chosen from the group consisting of the sodium, potassium, and ammonium salts thereof, thereby chromatographically eluting at least the barium, and then the radium constituents of the adsorbate, and collecting the fraction of eluate containing radium.

10. An adsorption-chromatographic elution process for separating radium values from an aqueous solution containing the same, together with barium values comprising passing said solution, in an unidirectional flow, through a bed of cation-exchange adsorbent to thereby effect adsorption of radium and barium values thereupon, thereafter passing through the adsorbent bed, in substantially the same direction as the flow of solution during adsorption, an aqueous solution of fractional molarity and a pH greater than 4.5 of a tartrate salt chosen from the group consisting of the sodium, potassium, and ammonium salts thereof, thereby chromatographically eluting at least the barium, and then the radium constituents of the adsorbate, and collecting the fraction of eluate containing radium.

11. An adsorption-chromatographic elution process for separating radium values from an aqueous solution containing the same, together with barium values comprising passing said solution, in a unidirectional flow, through a bed of cation-exchange adsorbent to thereby effect adsorption of radium and barium values thereupon, thereafter passing through the adsorbent bed, in substantially the same direction as the flow of solution during adsorption, an aqueous solution of fractional molarity and a pH greater than 4.5 of a malonate salt chosen from the group consisting of the sodium, potassium, and ammonium salts thereof, thereby chromatographically eluting at least the barium, and then radium constituents of the adsorbate, and collecting the fraction of eluate containing radium.

12. An adsorption-chromatographic elution process for separating radium values from an aqueous solution containing the same, together with barium values comprising passing said solution, in a unidirectional flow, through a bed of cation-exchange adsorbent to thereby effect adsorption of radium and barium values thereupon, thereafter passing through the adsorbent bed, in substantially the same direction as the flow of solution during adsorption, a substantially 0.5 molar aqueous solution having a pH of between 7.5 and 8.0 of ammonium citrate, thereby chromatographically eluting at least the barium, and then the radium, constituents of the adsorbate, and collecting the fraction of eluate containing radium.

13. An adsorption-chromatographic elution process for the separation of radium values from an aqueous solution containing the same in a concentration below $10^{-10}$ molar, together with barium and strontium in macroscopic concentration, which comprises passing said solution, in an unidirectional flow, through a bed of cation-exchange adsorbent to thereby effect adsorption of radium, barium, and strontium values thereupon, thereafter passing through the adsorbent bed, in substantialy the same direction as the flow of solution during adsorption, an aqueous solution of fractional molarity and a pH greater than 4.5 of a citrate salt chosen from the group consisting of the sodium, potassium, and ammonium salts thereof, thereby chromatographically eluting at least the radium constituent of the adsorbate, and collecting the fraction of eluate containing radium.

EDWARD R. TOMPKINS.

REFERENCES CITED

The following references are of record in the file of this patent:

Tomkins et al.—J. Am. Chem. Soc. vol. 69, Nov. 1947, pp. 2769–2777.

Johnson et al., Chem. & Engr. News, vol. 25, No. 35, Sept. 1, 1947 (page 2494) (260–Ion Exch.).